UNITED STATES PATENT OFFICE.

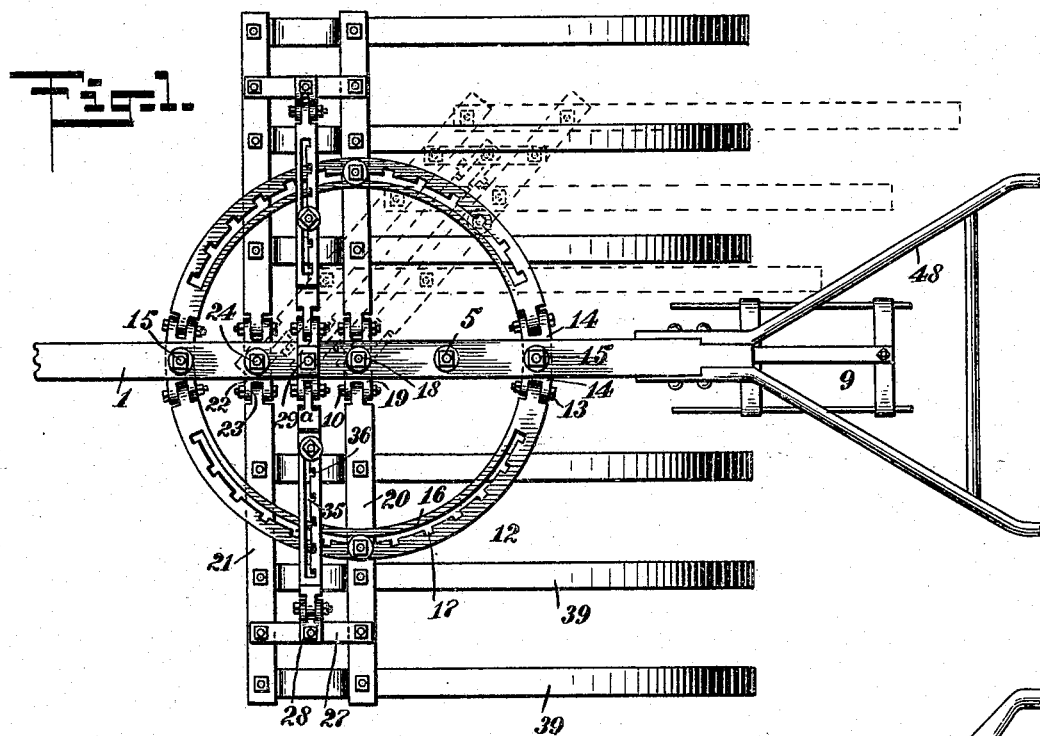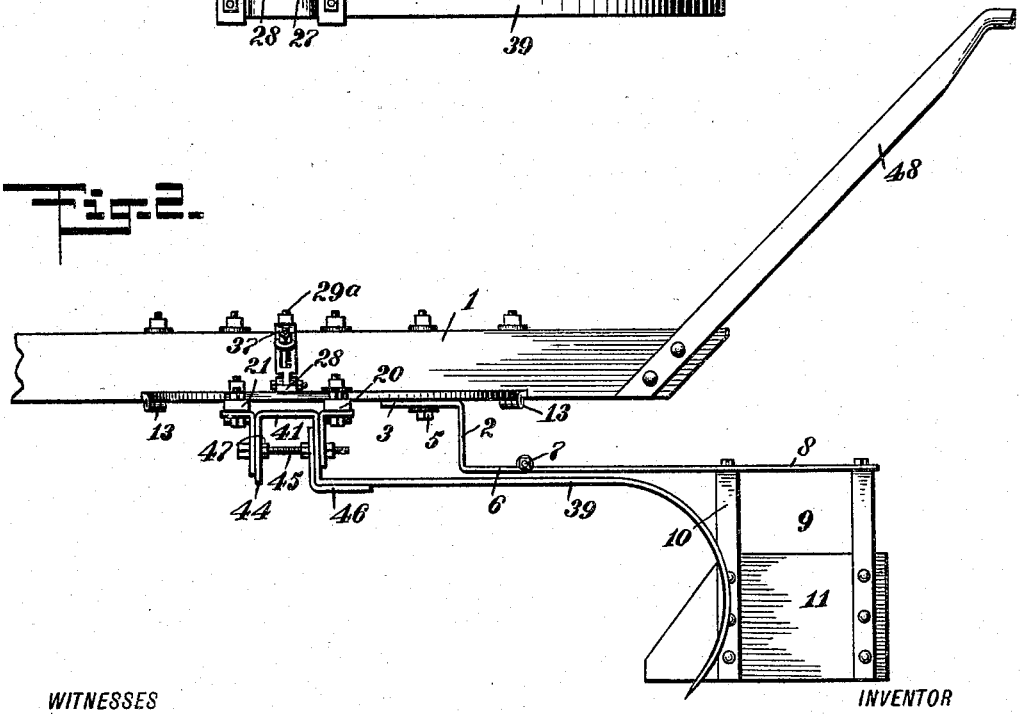

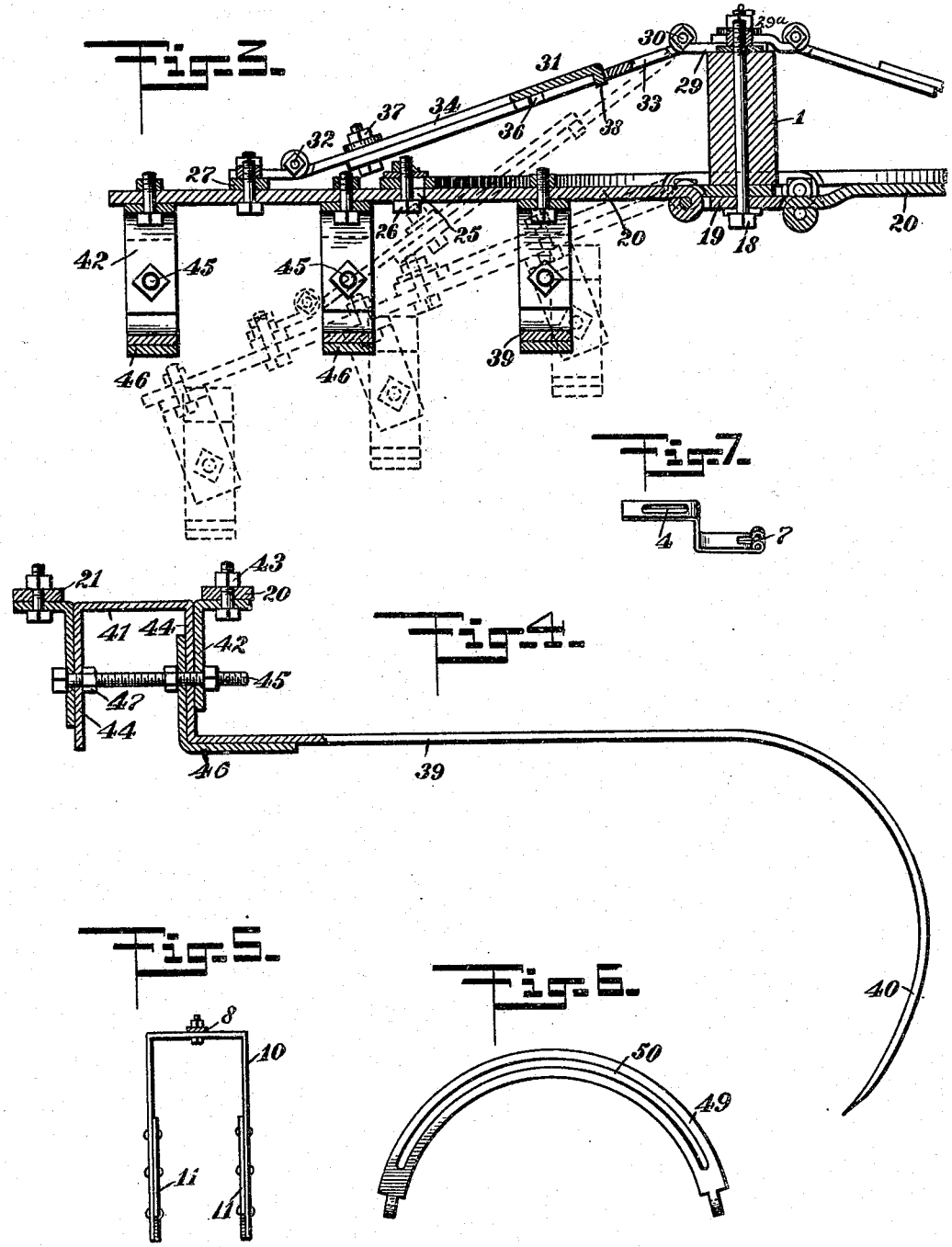

ARTHUR BRIGDEN, OF ALBERTVILLE, ALABAMA.

CULTIVATOR.

No. 930,830. Specification of Letters Patent. Patented Aug. 10, 1909.

Application filed May 24, 1909. Serial No. 497,899.

*To all whom it may concern:*

Be it known that I, ARTHUR BRIGDEN, a citizen of the United States, and a resident of Albertville, in the county of Marshall and State of Alabama, have invented a new and Improved Cultivator, of which the following is a full, clear, and exact description.

This invention relates to cultivators such as used in tilling growing crops.

The object of the invention is to produce a cultivator of simple construction, the teeth of which may be adjusted so as to change their distance apart as may be desired, and further to provide a construction which will enable the teeth to be adjusted as to their elevation to adapt the implement for use on a hillside or ridge.

The invention consists in the construction and combination of parts, to be more fully described hereinafter and particularly set forth in the claims.

Reference is to be had to the accompanying drawings forming a part of this specification, in which similar characters of reference indicate corresponding parts in all the figures.

Figure 1 is a plan of a cultivator constructed according to my invention, a portion of the tongue or pole being broken away; Fig. 2 is a side elevation of the implement, the pole being broken away; Fig. 3 is a vertical section taken in a transverse plane and showing substantially one-half of the implement, in this view the parts are represented in dotted lines so as to illustrate one of the possible adjustments of the implement; Fig. 4 is a cross section through the hoe bars taken in a front and rear plane and especially illustrating the manner of mounting the hoes or teeth, in this view the body of the tooth or hoe is shown in elevation; Fig. 5 is a vertical section through the rear portion of the implement and illustrating a guard which runs over the row, in this connection it should be understood that the cultivator is intended to cultivate on each side of the row of plants; Fig. 6 is a plan showing a modified form of a segment which constitutes a feature of the invention; and Fig. 7 is a section showing a bracket which affords means for attaching the guard.

Referring more particularly to the parts, 1 represents the tongue or pole of the implement. Near the rear end of this pole, and on the under side thereof a Z-bracket 2 is attached, the upper arm 3 whereof is provided with a longitudinal slot 4, as indicated in Fig. 7. Through the medium of this slot, the bracket is attached by means of a bolt 5, which passes through the beam, as indicated. The lower arm 6 of this Z-bracket extends rearwardly, and at its rear end, a hinge connection 7 is made with a trailer bar 8. To this trailer bar 8 a guard 9 is attached, said guard being formed of two substantially rectangular yokes 10, to the lower ends of which side plates or guard plates 11 are attached, as shown, and the forward edges of these guard plates are tapered, as indicated in Fig. 2. It should be understood that as the implement advances, this guard straddles the plants and protects them from being accidentally up-rooted by the teeth of the cultivator. The guard also operates as a guide for the implement. The implement is, of course, drawn along by two horses, a horse being on each side of the tongue.

To the under side of the tongue, and forward of the guard 9, semicircular segments 12 are attached. Each of these segments is connected by a hinge connection 13 with an anchor plate 14, and these anchor plates are attached by pivot bolts 15 which pass upwardly through the pole, as indicated in Fig. 3. Each segment 12 is provided with an arcuate slot 16, said slots being disposed about the center of the segment as an axis. These slots 16 are provided in their outer edges with a plurality of notches 17 spaced equidistant, as shown. The segments 12 are disposed about a center bolt or king bolt 18, as an axis, and by means of this bolt 18, on the under side of the tongue, anchor plates 19 are provided which have hinge connections for attaching transverse rear hoe bars 20. Forward hoe bars 21 are provided which are similar to the hoe bars 20, and which are also attached by anchor plates 22 having hinge connections 23. The anchor plates 22 are attached by a pivot bolt 24 similar to the bolt 18. In the bars 20, near the position of the slots 16, short slots 25 are formed, as indicated in Fig. 3, and through these slots clamping bolts 26 pass. When the nuts of these bolts 26 are loosened, these bolts may be slid inwardly toward the tongue so as to disengage them from the notches 17, and at this time the bars 20 may be swung in a front and rear direction on the axis of the bolt 18 as a pivot. The bars 20 and 21 are connected by short braces or straps 27, and at the middle points anchor plates 28 are attached. Opposite these anchor plates 28 on the upper side of the tongue, anchor plates 29 are provided, and these anchor plates 29 are connected by hinge connections 30 with extensible links 31, the lower ends of the links 31 being connected by hinge connections 32 with the anchor plates 28. The extensible links 31 are formed of two sections 33 and 34 which have their flat faces set together, as indicated. These sections are provided with longitudinal slots 35 having equidistant notches 36 formed in the side edges thereof. These notches may aline with each other, and through the slots or through the notches, a clamping bolt 37 passes. This bolt securely clamps the two sections together, and prevents them from sliding longitudinally with respect to each other. The upper section 34, as indicated in Fig. 3, is provided at its upper end with a downwardly projecting tip 38, and this tip projects into the slot of the lower section. This maintains the parts in alinement, as will be readily understood, and enables me to use a single bolt at this point, instead of two bolts. The anchor plates 28 and 29 are attached to the tongue by a pivot bolt 29$^a$.

In Fig. 3, the cultivator is shown in its normal position as to the elevated adjustment of the hoes. In dotted lines in this view I indicate the manner in which the elevation of the hoes may be altered. In order to adjust the hoes as suggested, it is only necessary to release the bolt 37 and extend the extensible links 31, as indicated by the dotted lines. This permits the adjacent segment to swing down into an inclined plane, as shown. The manner of securing the hoes 39 to the hoe bars will now be described: The bodies of these hoes 39 are disposed horizontally, as shown in Fig. 4, and the rear ends are formed into teeth 40 which till the soil, as will be readily understood. The forward ends of the bars are offset upwardly so as to form substantially rectangular heads 41. On the under sides of the hoe bars 20 and 21, angle brackets 42 are attached by bolts 43, as shown, and the vertical extensions 44 of the heads 41 lie against the inner faces of these brackets. Through the brackets and through the extensions 44 a clamping bolt 45 passes, and at the junction of the head with the body of the hoe, an angle brace 46 is formed on the forward and under side, and this angle brace is also attached by means of the bolt 45. The bolt is inserted so that its head is on the forward side of the forward angle bracket 42, and three clamping nuts 47 are provided, two of which clamp the angle brace 46 and the bracket 42 against opposite sides of the rear vertical extension 44 of the head 41. When the links 31 are extended, as indicated by the dotted lines in Fig. 3, the holes 39 are adjusted so as to maintain them in a plumb position, that is, so as to maintain their teeth 40 in a vertical plane. This is accomplished simply by loosening the clamping nuts and then loosening the holes on the axis of the bolt 45 until they come into the position shown in Fig. 3, then the nuts are clamped again.

In Fig. 3 I simply show how the vertical adjustment is accomplished on one side of the cultivator, but it should be understood that a similar adjustment can be effected on the opposite side so that all of the teeth of the cultivator will be disposed along an inclined line, as indicated by the dotted lines. Similarly, in Fig. 1 I have shown by the dotted lines the manner in which the right side of the cultivator may be adjusted, but it should be understood that the other side would be similarly adjusted in actual practice. By means of this horizontal adjustment the width of the cultivator can be changed at will so as to suit the circumstances or the particular requirements.

Special attention is called to the notches 17 and 36. On account of these notches 17 it should be understood that I do not depend upon the frictional force of the clamping bolts to hold the parts in position, and this is a highly advantageous feature. On account of the slot 4, the bracket 2 may be adjusted in a front and rear direction, as desired. To the rear end of the tongue a handle 48 is attached, which handle may be of the common form illustrated. If desired, instead of using the notches 17, where the work is of a very light character the clamping force of the bolts may be sufficient to hold the parts in position, in which case I may adopt the form of segment shown in Fig. 6. Referring to this view, 49 represents the segment which is simply a plain curved bar having a plain slot 50 with no notches whatever. This segment is attached in the same manner as the segments 12 and operates in substantially the same way, except that I rely solely upon the clamping force of the bolts to hold the parts rigid.

Having thus described my invention, I claim as new and desire to secure by Letters Patent,—

1. In a cultivator, in combination, a tongue, segments attached to said tongue on opposite sides thereof and adapted to swing up or down, hoe bars pivotally attached to said tongue and extending transversely thereof, means for clamping said hoe bars to said segments, and means for holding said segments in different adjusted positions in a vertical plane.

2. A cultivator having a tongue, a pair of segments attached to said tongue and adapted to swing in a vertical plane at each side thereof, hoe bars attached to said tongue and connected therewith, means for connecting said hoe bars to said segments, hoes carried by said hoe bars, and extension braces attached to said tongue and affording means for holding said hoe bars in an elevated or depressed position.

3. A cultivator having a tongue, anchor plates attached to said tongue, segments pivotally attached to said anchor plates and adapted to swing up or down, hoe bars pivotally connected with said tongue and adapted to swing up and down with said segments, means for attaching said hoe bars to said segments, means for holding said hoe bars in an elevated or depressed position, and hoes carried by said hoe bars.

4. A cultivator having a tongue, a pair of hoe bars mounted on opposite sides of said tongue adapted to swing up and down and adapted to swing in a front and rear direction, segments attached to said tongue on opposite sides thereof and having slots therein, bolts connecting said hoe bars with said segments through said slots, extensible braces connecting said hoe bars with said tongue and affording means for holding said hoe bars in an elevated or depressed position and in a rearwardly or forwardly displaced position, and hoes carried by said hoe bars.

5. A cultivator having a tongue, segments mounted on opposite sides of said tongue and adapted to swing up and down, said segments having slots therein, hoe bars connected with said tongue adapted to swing up and down and adapted to swing in a front and rear direction, bolts connecting said hoe bars with said segments through said slots, said slots having notches therein adapted to receive said bolts, means for locking said hoe bars rigidly to said tongue in an elevated or depressed position and in a forwardly or rearwardly disposed position, and hoes carried by said hoe bars.

6. A cultivator having a tongue, segments attached to the under side of said tongue adapted to swing up or down, extension links connected with the upper side of said tongue and connected with said segments, said extension links affording means for holding said segments in an elevated or depressed position, hoe bars adjustably attached to said segments, and hoes carried by said hoe bars.

7. A cultivator having a tongue, hoe bars extending transversely from said tongue and adapted to swing up and down, means for holding said hoe bars in an elevated or depressed position, hoes carried by said hoe bars extending in a front and rear direction, and clamping bolts connecting said hoes with said hoe bars and disposed in a horizontal position, said clamping bolts affording an axis of rotation for said hoes when said hoe bars are elevated or depressed whereby said hoes may be maintained in a plumb position.

8. A cultivator having a tongue, transversely disposed hoe bars pivotally connected with said tongue and adapted to swing up or down, hoes having heads, bolts connecting said heads to said hoe bars and disposed in a horizontal position, said bolts presenting an axis of adjustment for said hoes, and means for holding said hoe bars in an elevated or depressed position.

9. A cultivator having a tongue, segments attached to said tongue on opposite sides thereof and adapted to swing up and down, hoe bars connected with said segments on opposite sides thereof and adapted to swing in a front and rear direction, means for rigidly connecting said hoe bars to said segments, and extension links connected with said hoe bars and attached to said tongue and affording means for holding said hoe bars rigid.

10. A cultivator having a tongue, anchor plates, a bolt pivotally attaching said anchor plates to said tongue, a pair of segments attached on opposite sides of said tongue adapted to swing up and down and disposed about said bolt as an axis, hoe bars, forward hoe bars attached to said tongue, straps connecting said forward hoe bars with said first hoe bars, bolts for rigidly connecting said first hoe bars with said segments, extension links having slots connecting said tongue with said straps, and bolts running in said slots and affording means for holding said extension links rigid.

11. A cultivator having adjustable hoe bars, extension links affording means for holding said hoe bars in adjusted positions, said extension links comprising two sections sliding longitudinally upon each other and having alining slots, and a clamping bolt passing through said slots, one of said sections having a projection extending into the slot of the opposite section and affording means for holding said section in alinement.

In testimony whereof I have signed my name to this specification in the presence of two subscribing witnesses.

ARTHUR BRIGDEN.

Witnesses:
A. C. WALKER, Jr.
TIM V. CHUMLEY.